Jan. 9, 1962 — J. W. DYER ETAL — 3,015,835
WINDSHIELD WASHER AND COORDINATOR
Filed Oct. 7, 1957 — 4 Sheets-Sheet 1

INVENTORS
JOHN W. DYER
BROOKS H. SHORT
WALTER R. PARKER
BY John T. Mawri
THEIR ATTORNEY Jan. 9, 1962 J. W. DYER ETAL 3,015,835
WINDSHIELD WASHER AND COORDINATOR
Filed Oct. 7, 1957 4 Sheets-Sheet 2

INVENTORS
JOHN W. DYER
BROOKS H. SHORT
WALTER R. PARKER
BY John T. Mawin
THEIR ATTORNEY Jan. 9, 1962  J. W. DYER ETAL  3,015,835
WINDSHIELD WASHER AND COORDINATOR
Filed Oct. 7, 1957  4 Sheets-Sheet 3

INVENTORS
JOHN W. DYER
BROOKS H. SHORT
WALTER R. PARKER
BY John T. Mauum
THEIR ATTORNEY Jan. 9, 1962    J. W. DYER ETAL    3,015,835
WINDSHIELD WASHER AND COORDINATOR
Filed Oct. 7, 1957    4 Sheets-Sheet 4
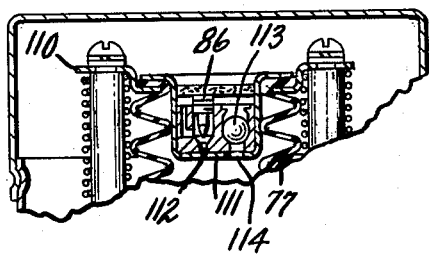
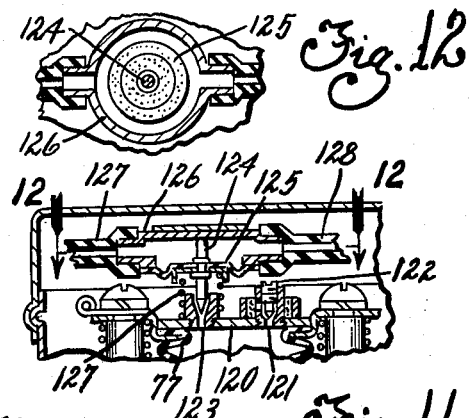
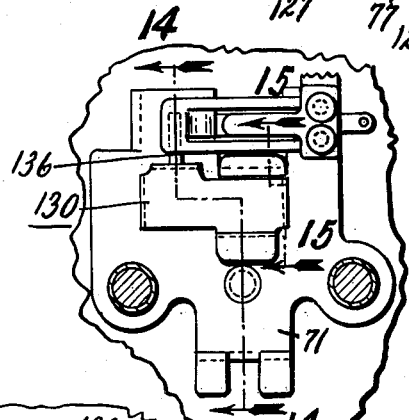
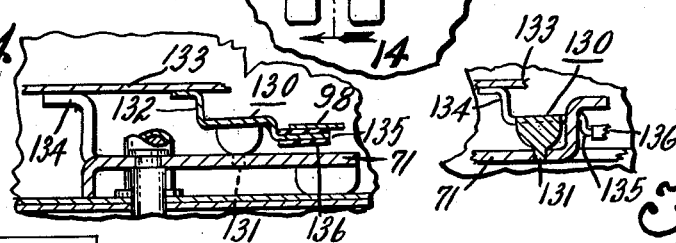
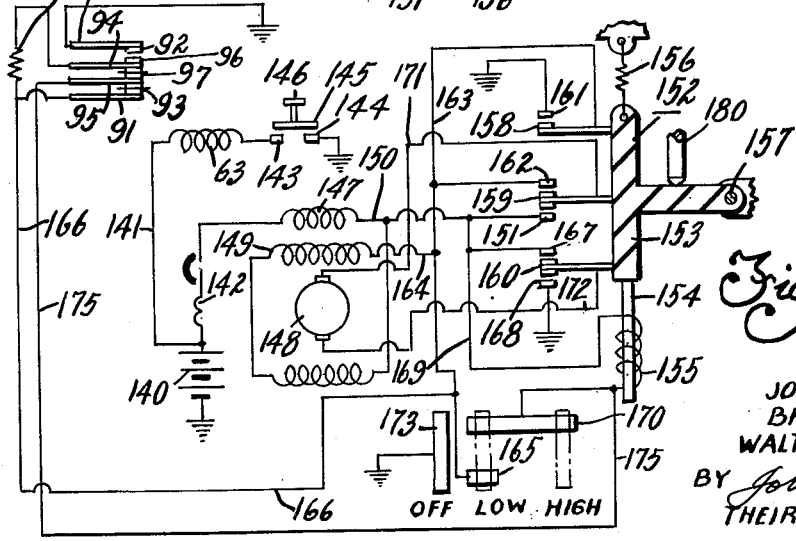
INVENTORS
JOHN W. DYER
BROOKS H. SHORT
WALTER R. PARKER
BY John T. Marvin
THEIR ATTORNEY 3,015,835
WINDSHIELD WASHER AND COORDINATOR
John W. Dyer, Pendleton, and Brooks H. Short and Walter R. Parker, Anderson, Ind., assignors to General Motors Corporation, Detroit, Mich., a corporation of Delaware
Filed Oct. 7, 1957, Ser. No. 688,463
9 Claims. (Cl. 15—250.02)

This invention relates to the art of windshield cleaning, and particularly to an improved washer pump and coordinator assembly for controlling the simultaneous operation of a wiper motor and the washer pump.

In recent years some vehicles have been equipped with coordinators for controlling the conjoint operation of a wiper motor and a washer pump to effect automatic cleaning of a vehicle windshield. In one type of system the wiper motor is controlled by a vacuum type dashpot coordinator which automatically initiates operation of the wiper motor during the delivery stroke of the washer pump, times the operation of the wiper motor for a predetermined interval after completion of the delivery stroke of the washer pump to dry the windshield, and thereafter automatically terminates operation of the wiper motor or returns control of the wiper motor to the preset manual position. The present invention relates to an improved washer pump and coordinator assembly of the electrical type which can be used with any type of wiper motor. Hence, specific reference herein to its use with an electric wiper motor is only by way of example and not by way of limitation. Accordingly, among our objects are the provision of an electromagnetic washer pump including means for controlling the conjoint operation of a wiper motor; the further provision of a coordinator unit including means for timing the operation of a wiper motor during an automatic cleaning cycle, and the still further provision of a washer-wiper coordinator assembly including means for preventing operation of the wiper motor if the reservoir is depleted of liquid solvent or the discharge conduits are blocked.

The aforementioned and other objects are accomplished in the present invention by utilizing dashpot means to actuate a wiper motor control in combination with a washer pump whereby the dashpot means are automatically actuated by the washer pump during the intake stroke thereof. Specifically, the washer pump and coordinator assembly of this invention comprises an electromagnetic pump of a type somewhat similar to that disclosed in Patent No. 2,757,615, Bolles et al., and thus comprises a housing having a solenoid therein including a winding and a core having a frusto conical pole. The liquid displacing member comprises a diaphragm which is spring urged in a direction to effect the delivery stroke and is attached to an armature having a complementary conical recess so that upon energization of the solenoid winding the intake stroke of the liquid displacing member will be effected. The pump assembly is adapted to be attached to the cover of a liquid solvent reservoir so as to be disposed within the liquid solvent reservoir.

The coordinator unit comprises a bellows type dashpot, one end of which is engageable with a platform movable with the washer pump armature. In one embodiment the bellows dashpot has associated therewith a flexible type one-way check valve and an adjustable metering orifice whereby the bellows can be rapidly compressed by opening of the check valve and the rate of expansion of the bellows is controlled by the metering orifice. One end of the bellows is attached to an end cap which is restrained against movement in both directions by a pair of upstanding guide pins. The other end of the bellows is attached to an end plate which is slidable on the guide pins, with compression springs encircling the guide pins and normally tending to expand the bellows.

In both embodiments, the platform attached to the armature supports a switch assembly, constituting the control for an electric windshield wiper motor. However, as alluded to hereinbefore, this is only exemplary as it is readily apparent that the coordinator could be used to control other types of wiper motors, either mechanical, hydraulic or vacuum. Using an electric motor, the coordinator is designed for use with a control circuit of the type disclosed in copending application Serial No. 653,665, Gute et al., filed April 18, 1957, and assigned to the assignee of this invention, now Patent No. 2,959,968.

Accordingly, the switch assembly carried by the platform is of the snap acting type and includes a pair of stationary contacts and a pair of movable contacts. The switch assembly is actuated to energize the electric motor upon relative movement between the bellows assembly and the platform, such as occurs during the delivery stroke of the washer pump. When the movable end plate of the bellows assembly is in contact with the platform, the switch assembly return control of the electric wiper motor to the operator by means of a manual control switch.

In a modified embodiment, the bellows assembly includes a ball type check valve in lieu of a rubber flap type check valve. In a still further modified embodiment the check valve for permitting rapid compression of the bellows is controlled by a diaphragm assembly connected in the discharge line, or conduit, of the washer pump. In this embodiment, relative movement cannot occur between the bellows assembly and the platform if the liquid reservoir is depleted of liquid solvent or the discharge conduit is blocked, by reason of freezing, etc.

Operation of all embodiments is the same when the reservoir contains liquid solvent and the discharge conduits and the washer nozzles are open. During this operation, upon energization of the washer pump solenoid, the bellows is compressed simultaneously with the intake stroke of the washer pump. Upon deenergization of the washer solenoid, the delivery stroke of the pump is effected by the spring, at which time the platform is displaced relative to the bellows assembly so as to actuate the wiper motor control switch and thereby effect conjoint operation of the washer pump and the wiper motor. Operation of the wiper motor will continue for a predetermined time interval as determined by the rate of expansion of the bellows dashpot controlled by the metering orifice. When the movable end plate of the bellows dashpot again engages the platform, the switch will be moved to its normal position so as to return control of the wiper motor to the manual control switch. Thus, the mechanism of this invention automatically initiates operation of the wiper motor during the washing cycle so that the wiper blades will be oscillated across the surface of a windshield as the liquid solvent is discharged thereon. In addition, operation of the wiper motor will continue for a drying cycle after completion of the delivery stroke of the washer pump, after which the wiper motor will automatically be deenergized.

In a third modification, the wiper motor will not be turned on if the solvent reservoir is empty when the washer switch is closed, since the pressure responsive diaphragm will not close the check valve if the liquid solvent reservoir is empty. In all embodiments, the wiper motor will not be automatically energized if the lines are clogged since no relative movement will occur between the bellows dashpot and the platform attached to the solenoid armature.

Further objects and advantages of the present invention will be apparent from the following description, reference being had to the accompanying drawings, wherein preferred embodiments of the present invention are clearly shown.

In the drawings:

FIGURE 10 is a fragmentary sectional view of a modified embodiment.

FIGURE 11 is a fragmentary sectional view of a further embodiment.

FIGURE 12 is a sectional view taken along line 12—12 of FIGURE 11.

FIGURE 13 is a view of the switch assembly similar to FIGURE 6 of the embodiment of FIGURE 11.

FIGURES 14 and 15 are fragmentary sectional views taken along lines 14—14 and 15—15, respectively, of FIGURE 13.

FIGURE 16 is an electric circuit diagram of the washer pump and coordinator assembly when used with an electric wiper motor.

Figure 1:
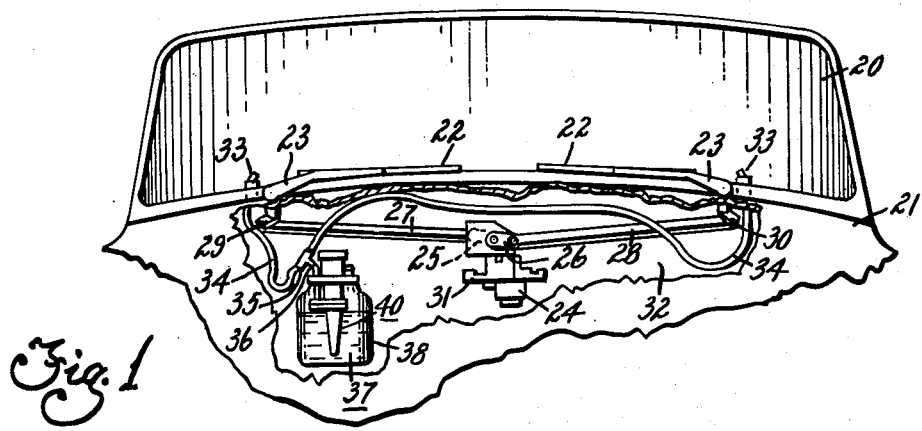
FIGURE 1 is a fragmentary view, partly in section and partly in elevation, of a vehicle equipped with the windshield washer and coordinator assembly of this invention.

With particular reference to FIGURE 1, a vehicle is shown including a windshield 20 and a cowl 21. In accordance with conventional practice, the vehicle is equipped with a pair of wiper blades 22 carried by wiper arms 23 which are movable over asymmetrical paths across the outer surface of the windshield 20. The wiper arms 23 are oscillated by an electric motor 24 through a pair of crank arms 25 and 26, connecting rods 27 and 28 and crank arms 29 and 30. The wiper motor and connecting linkage may be of the type disclosed in the aforementioned copending application, Serial No. 653,665, and thus the motor 24 includes a bracket 31 which is attached to the vehicle firewall 32. The vehicle is also shown having a washer nozzle 33 located adjacent each wiper shaft through which liquid solvent may be discharged onto the windshield and into the path of the wiper blades 22. The nozzles 33 are connected to discharge conduits 34 which are attached to the ends of a T-coupling 35, the coupling 35 also being connected to the discharge conduit 36 of a washer pump and coordinator assembly generally designated by the numeral 37.

With particular reference to FIGURES 2 through 9, one embodiment of the washer pump and coordinator assembly 37 will be described. The washer pump and coordinator assembly includes a liquid reservoir, or jar, 38 having an opening adjacent its top arranged to receive a cover 39. The cover 39 supports an electromagnetic washer pump generally designated by the numeral 40 comprising a solenoid casing 41 and a pump housing 42 which are secured together by means of rivets such as indicated by numeral 43. A diaphragm 44 of suitable elastomeric material is clamped between the solenoid housing 41 and the pump housing 42. The pump housing 42 includes a depending portion 45 which terminates short of the bottom of the jar 38, this portion constituting an inlet conduit and containing a ball type check valve 46 which coacts with a valve seat 47. The end of the inlet conduit 45 supports a wire strainer 48, and the ball check valve 46 is movable between the valve seat 47 and a retainer ring 49. A pumping chamber 50 is formed between the diaphragm 44 and the housing 42, the pumping chamber 50 communicating through passage 51 with a ball type outlet check valve 52 which is movable between a seat 53 and a cross pin 54. The outlet port of the pump housing communicates with a discharge conduit 55 which extends through the cover 39 and without the reservoir 38. The diaphragm 44 is also clamped between a pair of plates 56 and 57 by means of a screw 58 which is threaded into a movable armature 59 supported for reciprocable movement within the solenoid housing by a sleeve 60. The upper plate 57 is engaged by one end of a compression spring 61 which encircles a portion of the armature 59, the other end of the compression spring 61 engaging a flanged annulus 62 suitably secured to the solenoid housing 41. The function of the spring 61 is to effect the delivery stroke of the liquid displacing member, or diaphragm 44 by forcing liquid solvent from the pumping chamber through the check valve 52 into the conduit 55.

Figure 2:
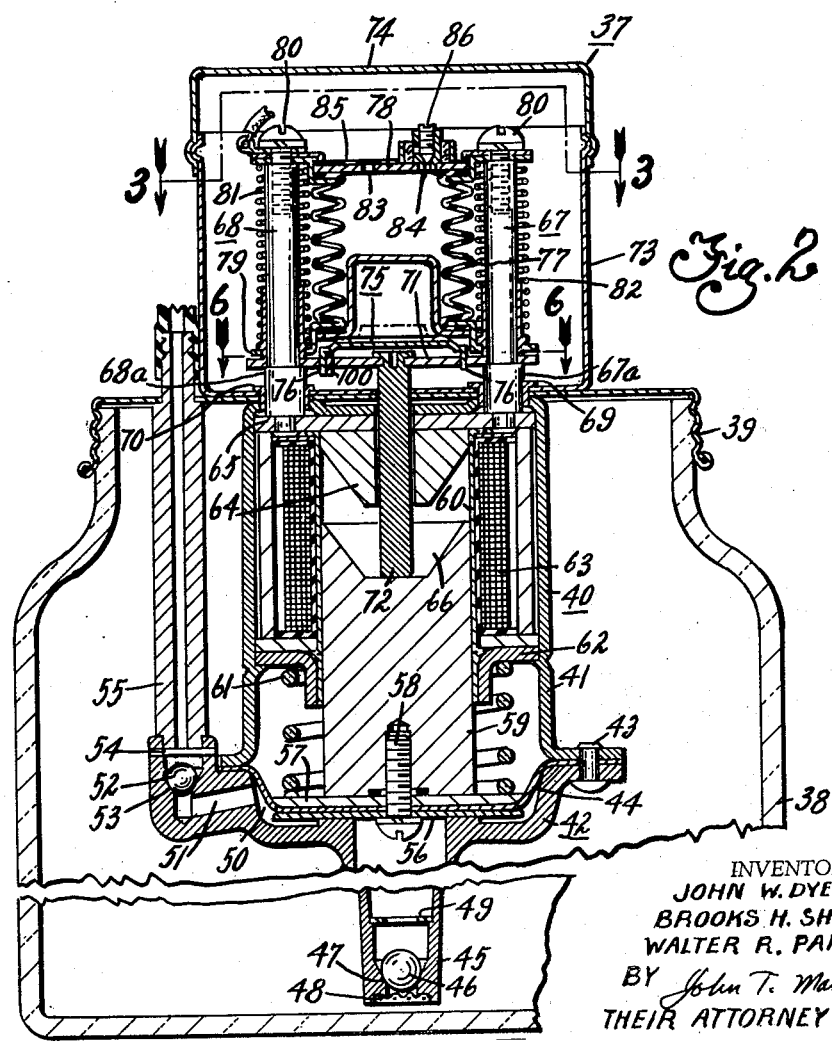
FIGURE 2 is a fragmentary sectional view of a washer pump and coordinator assembly constructed according to one embodiment of this invention.

A solenoid winding 63 is disposed within the housing 40, and partially encompasses the armature 59. The solenoid winding 63 magnetizes a core 64 attached to an end plate 65 which is clamped between the flanged annulus 62 and the closed end of the solenoid housing, 41. The core 64, as shown in FIGURE 2, is of frusto conical shape, and the armature 59 includes a complementary frusto conical recess 66 so as to provide a uniform air gap between the core 64 and the armature 59. Upon energization of the solenoid winding 63, the armature 59 is attracted by the core 64 and moved into engagement therewith thereby expanding the pump chamber 50 and causing the flow of liquid solvent through the check valve 46. Upon deenergization of the winding 63, the spring 61 automatically effects the delivery stroke of the diaphragm 44. The washer pump, per se, is of the general type disclosed in the aforementioned Patent 2,757,615.

The end plate 65 has attached thereto a pair of upstanding guide pins 67 and 68 having shoulders 67a and 68a, the solenoid housing 41 being attached to the cover 39 by tubular rivets 69 and 70 which encompass the guide pins 67 and 68, respectively. The guide pins 67 and 68 slidably receive a switch bracket, or platform, 71 which is attached to a rod 72 that extends through the cover 39, the core 64, and into engagement with the armature 59. In addition, the cover 39 has attached thereto a dashpot housing 73, a portion of which is interposed between the cover 39 and the ends of the tubular rivets 69 and 70. The dashpot housing 73 has an open end adapted to receive a sheet metal cover 74 as shown in FIGURE 2.

Figure 6:
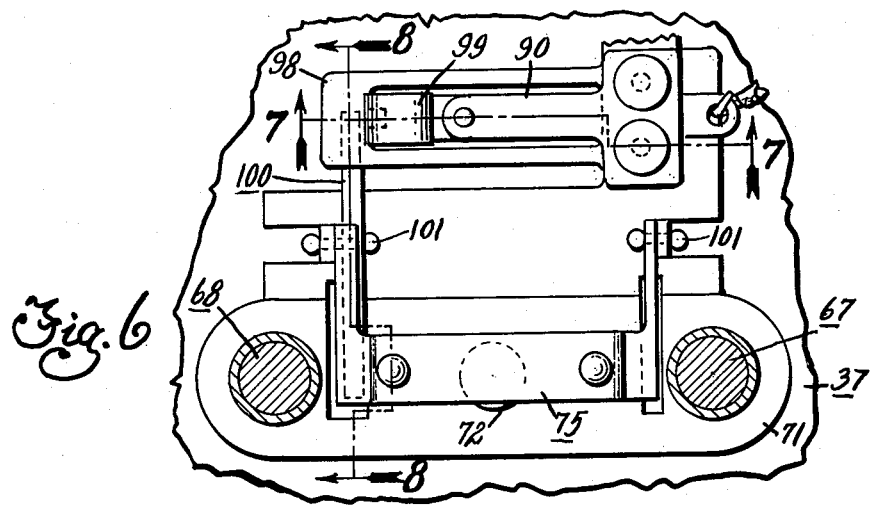
FIGURE 6 is a fragmentary sectional view taken along line 6—6 of FIGURE 2.

A switch actuating bracket 75 is rockably supported on the platform 71 by means of pins 101, as seen in FIGURE 6, and also has a pair of depending tangs 76 which extend through openings in the platform 71. A bellows type dashpot 77 of elastomeric material has attached thereto end plate assemblies 78 and 79. The end plate assembly 78 is rigidly connected to the guide pins 67 and 68 by means of screws 80. The lower end plate assembly 79 is slidably mounted on the guide pins 67 and 68, and is normally urged into contact with the platform 71 by a pair of coil springs 81 and 82 which encircle the guide pins 67 and 68, respectively, opposite ends of the springs engaging end plate assemblies 78 and 79. In addition, the end plate assembly 78 has a pair of openings therethrough designated by numerals 83 and 84. The opening 83 has associated therewith a rubber type check valve 85 which opens to permit compression of the bellows type dashpot 77 and closes during expansion thereof. The opening 84 has associated therewith an adjustable needle valve 86 which constitutes a metering orifice for timing the rate of expansion of the bellows dashpot 77.

Figure 3:
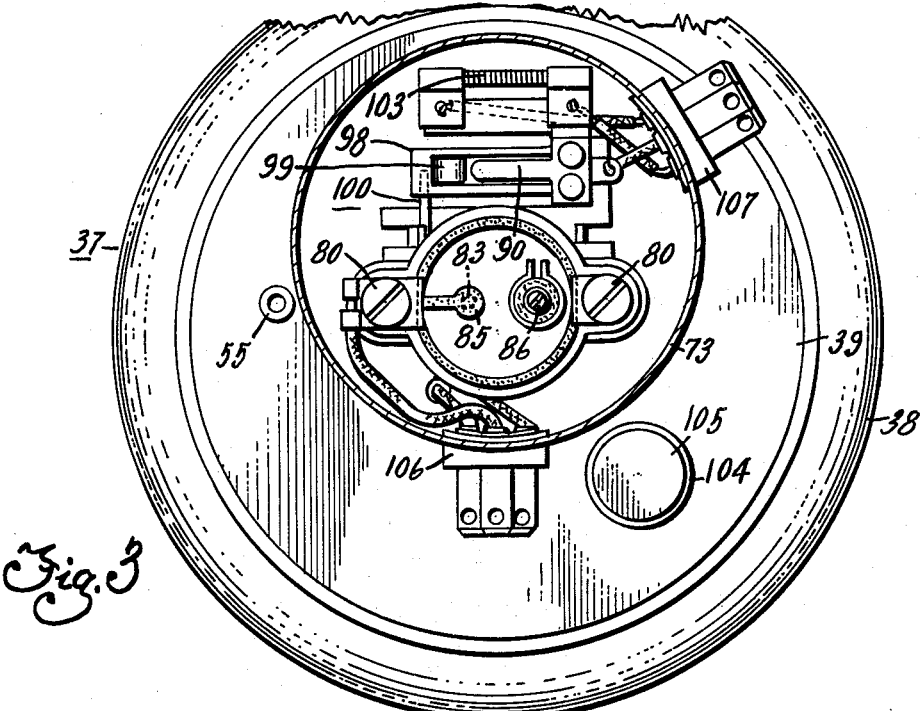
FIGURE 3 is a fragmentary sectional view taken along line 3—3 of FIGURE 2.
Figure 7:
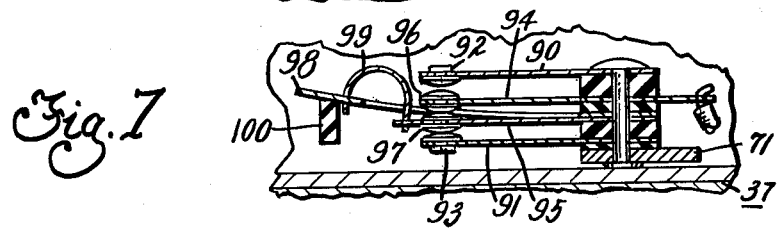
FIGURE 7 is a sectional view taken along line 7—7 of FIGURE 6.
Figure 8:
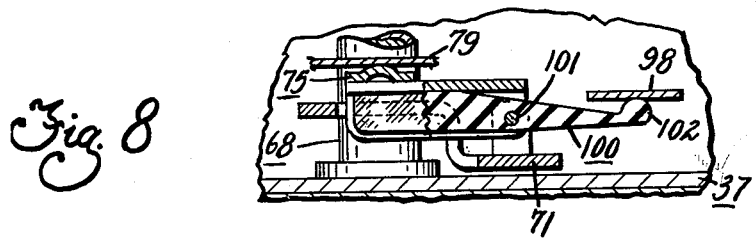
FIGURES 8 and 9 are sectional views taken along lines 8—8 of FIGURE 6 illustrating the manner in which the switch of the first embodiment is operated.
Figure 9:
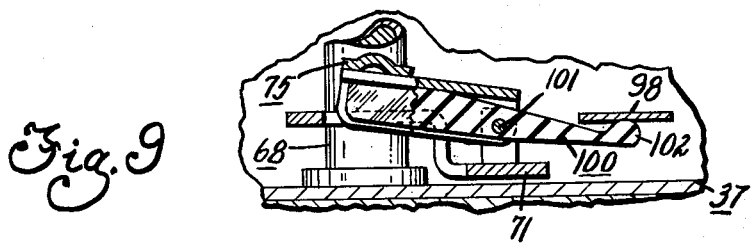

With particular reference to FIGURES 3, 6 and 7, the switch assembly for controlling conjoint operation of the wiper motor with the washer pump will be described. As seen in FIGURE 7, the switch comprises a pair of stationary switch arms 90 and 91 carrying contacts 92 and 93, respectively, and a pair of movable leaf spring arms 94 and 95 carrying contacts 96 and 97, respectively. The switch arms 90 and 91, and the leaf spring 94 and 95, are mounted in stacked relation at one end, each one being insulated from the adjacent one by suitable insulating washers. The switch also includes an actuator comprising a leaf spring 98 which is connected by a C-shaped toggle spring 99 to the leaf spring 95. The leaf spring 98 is inherently biased downwardly as viewed in FIGURE 7, so as to normally maintain contacts 93, 96 and 97 in engagement. In order to move contacts 96 and 97 into engagement with contact 92, the leaf spring 98 must be moved upwardly, and in this embodiment, this is accomplished by a switch actuator arm 100 which is pivoted intermediate its ends on one of the pins 101 attached to the bracket 75 which is pivotally mounted on the platform 71. As shown in FIGURE 8, when the lower end plate 79 of the bellows engages the bracket 75 under the urge of the springs 81 and 82, the arm 100 and the bracket 75 are maintained in the position of FIGURE 8, in which position end 102 of the arm 100 engages leaf spring 98 and biases it upwardly so as to maintain contact 96 in engagement with contact 97 and contact 97 in engagement with contact 93. However, upon displacement of the end plate 79 from the platform 71 as shown in FIGURE 9, the leaf spring 98 forces the arm 100 about one of the pivot pins 101 to the position of FIGURE 9 and thereby moves contact 97 into engagement with contact 96 and contact 96 into engagement with contact 92.

The platform, or bracket 71, may also support a resistor 103, the function of which will be described hereinafter. As shown in FIGURE 3, the cover 39 is formed with a spout 104 having a cover 105 which can be removed to facilitate filling of the jar 38. In addition, the dashpot housing 73 carries terminal blocks 106 and 107.

With particular reference to FIGURE 10, a modified embodiment dashpot timing mechanism is disclosed wherein the top end plate 110 of the bellows is formed with a central aperture, and the upper end of the bellows is clamped between the plate 110 and a cup-shaped member 111 which extends into the bellows 77. The cup-shaped member 111 carries the needle valve 86 which cooperates with an end opening 112 and a ball type check valve 113 which cooperates with an opening 114. In this embodiment, of course, the upwardly extending cup-shaped portion of the lower end plate 79, as shown in the embodiment of FIGURE 2, would not be present, and the lower end plate assembly would be substantially planar.

With particular reference to FIGURES 11 through 15, a still further modification of the dashpot and switch mechanism is disclosed. In this embodiment, the upper end plate 120 of the dashpot bellows 77 is formed with an opening 121 which cooperates with a needle valve 122 and a second opening 123 which cooperates with a check valve 124 carried by a diaphragm 125. The diaphragm 125, of flexible material, constitutes one side of a hollow disk 126, and is normally urged by a spring 127 disposed between the end plate 120 and the diaphragm 125 to a position where the check valve 124 is open. The diaphragm housing 126 is connected to the delivery conduit 55 by a nipple 127 as well as to a second nipple 128 which connects with the T-coupling 35 as shown in FIGURE 1. During the delivery stroke of the washer pump, the pressure in the delivery conduit varies between 9 and 15 p.s.i., which pressure is sufficient to compress the spring 127 by expanding the diaphragm 125 to close the port 123. However, if the reservoir 38 is empty when the wash cycle initiates operation, the wiper motor switch will not be actuated since there will be no relative displacement between the bellows and the platform 71 due to the fact that the check valve 124 will remain open, and hence the bellows will expand rapidly during the false delivery stroke of the washer pump.

Referring to FIGURES 13 to 15, in the modified embodiment of FIGURE 11, a slightly different type of switch actuating mechanism is employed. This mechanism comprises a rocker plate 130 having tangs 131 which extend through apertures in the platform 71. The rocker plate 130 has a flanged portion 132 arranged to be engaged by the lower bellows end plate 133 which is substantially planar. In addition, the platform 71 is formed with an upstanding flange portion 134 arranged to constitute a stop limiting the expanded position of the bellows 77. When the bellows end plate 133 engages the flange portion 132, the rocker plate 130 is moved to the position of FIGURE 14, in which position the leaf spring 98 is biased upwardly, or, in other words, in the "off" position.

However, upon displacement between the lower end plate of the bellows and the platform, the leaf spring 98 will pivot the rocker arm in a clockwise direction as viewed in FIGURE 14 so as to permit the switch to be closed. In this embodiment the lower plate 130 has a projecting arm 135 having an insulating sleeve 136 thereabout disposed beneath the leaf spring 98.

With particular reference to FIGURE 16, the electric circuit interconnecting the washer pump and coordinator assembly of this invention with an electric windshield wiper motor of the type shown in the aforementioned copending application Serial No. 653,655 will be described. The circuit includes a battery 140, one terminal of which is connected to a wire 141 and a thermal overload switch 142. The wire 141 is connected through solenoid winding 63 to a switch contact 143. Switch contact 143 can be connected to switch contact 144 by a bridging member 145 which is attached to a push button 146, switch contact 144 being connected to ground.

The overload switch 142 is connected to one end of a series field winding 147 of a reversible motor, the armature of which is indicated by numeral 148. The motor includes a split shunt field winding 149, one end of which is connected to wire 150, wire 150 also being connected to the series field winding 147. Wire 150 is also connected to a stationary switch contact 151 of a relay control switch designated generally by the numeral 152. The relay control switch 152 includes a movable contact carrier 153 which is connected to an armature 154 that can be actuated by a relay coil 155. The carrier 153 is normally biased upwardly by a spring 156 and is pivoted at 157 to a fixed support. The carrier 153 carries movable contacts 158, 159 and 160. Contact 158 is engageable with a contact 161 which is connected to ground. Contact 159 is engageable with either contact 151 or contact 162 which is connected to a wire 163, wire 163 being connected to switch contact 158, wire 164 to one end of the shunt field winding 149, a manual control switch contact 165 and a wire 166.

Switch contact 160 is engageable with either switch contact 167 or 168, switch contact 168 being connected to ground. Switch contact 167 is connected to a wire 169 which connects with wire 150 as well as with one end of the relay coil 155. The other end of the coil 155 is connected to a contact 170 of the manual control switch. One brush of the armature 148 is connected by wire 171 to movable switch contact 159, and the other brush of the armature is connected by wire 172 to movable switch contact 160. The manual control switch includes a bridging member 173 which is connected to ground, the bridging member being movable between "off" "low" and "high" positions as indicated in FIGURE 16.

The wire 166 is connected to switch contact 93. Switch contact 93 is also connected through the resistor 103 to leaf spring 94 and contact 96. Contact 97 and leaf spring 95 are connected to one end of the relay coil 155. Contact 92 is connected to ground.

Operation of the windshield wiper motor under manual control is as follows. When the manually movable bridging member 173 is moved to the low speed position, contacts 170 and 165 are interconnected and are grounded through the bridging contact 173. Accordingly, the relay 155 will be energized moving the armature 154 and the carrier 153 downwardly so that contact 159 engages contact 151, and contact 160 engages contact 168. In addition, the end of the shunt field winding 149 is grounded so that it is energized. This will cause rotation of the wiper motor in the forward direction at low speed. When the bridging member 173 is moved to the high speed position, the shunt field winding is open circuited thus causing the motor to rotate at high speed in the forward direction. When the switch bridging member 173 is moved to the "off" position, the relay 155 is deenergized and the spring 156 moves the carrier 153 to a position where contact 160 engages contact 167, contact 159 engages contact 162, and contact 158 engages contact 161. This completes the energizing circuit for the motor at low speed in the reverse direction since the current flow through the armature has been reversed, and when the wiper blades reach the parked position the carrier 153 is engaged by a mechanically actuated pin 180 which moves the carrier 153 to an intermediate position as shown in FIGURE 16 wherein the motor is deenergized.

Figures 4, 5:
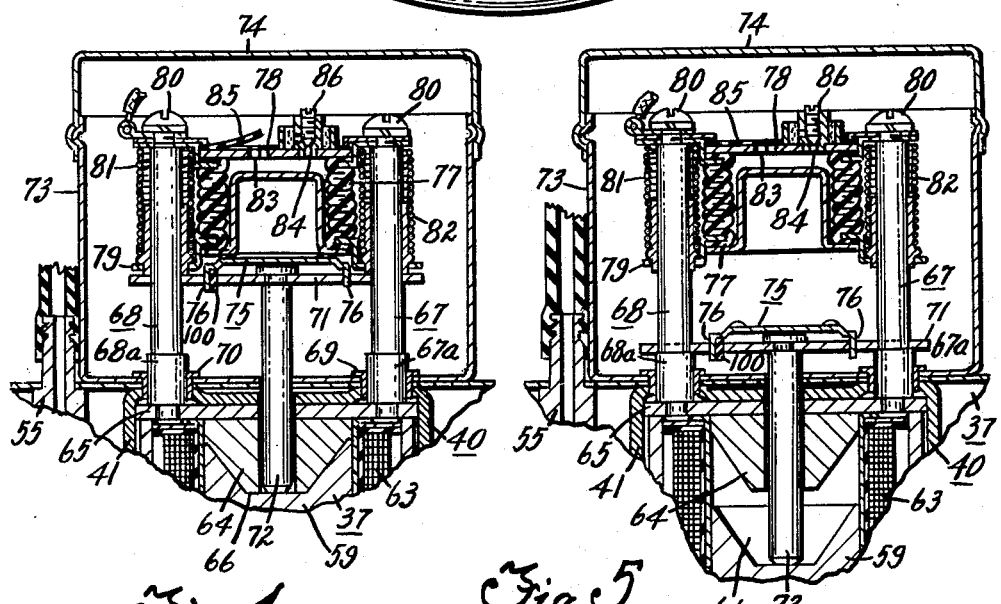
FIGURES 4 and 5 are fragmentary sectional views illustrating operation of the washer and coordinator assembly.

Upon closure of the washer switch 146, the solenoid winding 63 is energized to complete the intake stroke of the washer pump as shown in FIGURE 4. As soon as the switch 146 is opened, the spring 61 which is compressed, and thus has energy stored therein during the intake stroke, acts upon the diaphragm 44 to initiate the delivery stroke of the washer pump. This will cause displacement of the platform 71 relative to the end plate 79 of the bellows dashpot 77 as shown in FIGURE 5, whereupon the leaf spring 98 will move switch contacts 97 and 96 out of engagement with contact 93 and into engagement with contact 92 by forcing the actuator arm 100 to the position of FIGURE 9. Accordingly, the relay 155 will be energized from the battery, through the overload switch 142, the series field winding 147, the wires 150 and 169, through relay coil 155, the wire 175 to switch contact 97 which engages switch contact 96 and switch contact 92 which is connected to ground. Upon energization of relay 155, the armature 154 of the carrier 153 will be moved downwardly so that contacts 159 and 160 will engage contacts 151 and 168 respectively.

At the same time, the shunt field winding will be energized through wire 166 and resistor 103 thereby operating the motor at relatively high speed in the forward direction. After completion of the delivery stroke of the pump, the motor continues to operate at high speed during the drying cycle until the bellows dashpot 77 expands completely under the action of springs 81 and 82, at which time the end plate 79 will engage the bracket 75 as shown in FIGURE 8 and move the platform 71 against shoulders 67a and 68a, thereby effecting pivotal movement of the actuator arm 100 so as to move the leaf spring 98 over center to deenergize the wiper motor by moving contacts 96 and 97 out of engagement with contact 92 and into engagement with contact 93. Thus, a complete washing and drying cycle is completed automatically upon momentary closure and opening of the push button switch 145.

Operation of all embodiments of the present invention is identical as above described if the jar 38 contains liquid solvent and the discharge conduits and nozzles are open. Likewise in all embodiments if the discharge conduits are blocked, the wiper motor will not be turned on since no relative displacement will occur between the bellows 77 and the platform 71. In the modified embodiment in FIGURES 11 through 15, the wiper motor will likewise not be turned on if the liquid solvent is depleted in the jar 38, whereas it will operate if it is depleted in the embodiments of FIGURES 2 through 9 and 10.

From the foregoing it is readily apparent that the present invention provides a washer pump and coordinator assembly which effects automatic conjoint operation of a washer pump and a windshield wiper motor together with means for prolonging operation of the wiper motor after completion of the delivery stroke of the washer pump so as to dry the windshield.

While the embodiments of the invention as herein disclosed constitute preferred forms, it is to be understood that other forms might be adopted.

What is claimed is as follows:

1. A windshield cleaning system including, a washer unit including a pump having electromagnetic means for directly effecting the intake stroke thereof and energy storing means for effecting the delivery stroke thereof, said pump being connected to a delivery conduit, a wiper unit, switch means for energizing the electromagnetic means for effecting the intake stroke of the pump, means operatively connected with the pump and actuated during the intake stroke thereof for automatically initiating operation of the wiper unit during the delivery stroke of the washer pump including dashpot means for continuing operation of the wiper unit for a predetermined time interval.

2. The windshield cleaning system set forth in claim 1 wherein said dashpot means comprises a bellows and wherein the operative connection between said pump and said bellows comprises a member adapted to compress said bellows during the intake stroke of the pump and movable relative to said bellows during the delivery stroke of said pump to activate said wiper unit.

3. The cleaning system set forth in claim 2 including resilient means for expanding said bellows during the delivery stroke of said pump to time the operation of said wiper unit, said bellows being maintained in engagement with said member to preclude initiation of operation of said wiper unit if the delivery conduit is blocked.

4. The combination set forth in claim 2 wherein said bellows includes a one-way check valve permitting rapid compression thereof during the intake stroke of said pump, and wherein said bellows includes a metering orifice for determining the rate of expansion of said bellows to time the interval of operation of said wiper unit.

5. A windshield cleaning system including, a washer unit including a pump having electromagnetic means for effecting the intake stroke thereof and energy storing means for effecting the delivery stroke thereof, said pump being connected to a delivery conduit, a wiper unit including an electric motor, switch means for energizing said electromagnetic means for effecting the intake stroke of said pump, means operatively connected with the pump and actuated during the intake stroke thereof for automatically initiating operation of the wiper unit during the delivery stroke of the washer pump including dashpot means for continuing operation of the wiper unit for a predetermined time interval, said dashpot means comprising a bellows, the operative connection between said pump and said bellows comprising a member adapted to compress said bellows during the intake stroke of the pump and movable relative to said bellows during the delivery stroke of said pump, and switch means for completing an electric circuit to the electric motor of said wiper unit upon displacement between said bellows and said member.

6. A windshield cleaning system including, a washer unit including a pump having electromagnetic means for effecting the intake stroke thereof and energy storing means for effecting the delivery stroke thereof, said pump being connected to a reservoir, a wiper unit, switch means for energizing the electromagnetic means to effect the intake stroke of the pump, means operable automatically to initiate operation of the wiper unit during the delivery stroke of the pump and to continue operation of the wiper unit for a predetermined time interval including a dashpot, and means operatively associated with said dashpot for preventing operation of said wiper unit if the reservoir for the washer unit is empty, said dashpot including a metering orifice for controlling the rate of expansion thereof to time the interval of wiper operation and a check valve permitting rapid compression thereof, said last recited means comprising fluid pressure responsive means connecting the delivery conduit of the washer pump for automatically closing said check valve if the reservoir contains liquid solvent, said dashpot including resilient means for maintaining said check valve open if said reservoir is empty.

7. A washer pump and coordinator assembly including, a washer pump having a liquid displacing member with an intake stroke and a delivery stroke, electromagnetic means for effecting the intake stroke of said liquid displacing member and energy storing means for effecting the delivery stroke thereof, a wiper control element having "off" and "on" positions operatively connected with said member and movable therewith during the intake and delivery strokes thereof, a bellows dashpot engageable with said control element so as to be compressed during the intake stroke of said liquid displacing member, said bellows dashpot maintaining said control element in its "off" position during engagement therebetween, resilient means for expanding said bellows dashpot during the delivery stroke of said liquid displacing member, and means controlling the rate of expansion of said bellows dashpot during said delivery stroke whereby said wiper control element will be displaced relative to said bellows dashpot from its "off" to its "on" position.

8. The combination set forth in claim 7 wherein said last recited means comprises a metering orifice.

9. The combination set forth in claim 7 wherein said bellows dashpot includes check valve means permitting rapid compression thereof during the intake stroke of said liquid displacing member.

References Cited in the file of this patent

UNITED STATES PATENTS

| | | |
|---|---|---|
| 1,284,930 | Roberts | Nov. 12, 1918 |
| 2,638,849 | Budlane | May 19, 1953 |
| 2,649,332 | Rappl | Aug. 18, 1953 |
| 2,743,473 | Oishei | May 1, 1956 |
| 2,816,316 | Oishei | Dec. 17, 1957 |
| 2,877,483 | Oishei | Mar. 17, 1959 |

FOREIGN PATENTS

| | | |
|---|---|---|
| 523,471 | Belgium | Oct. 31, 1953 |
| 1,111,220 | France | Oct. 26, 1955 |